No. 627,918. Patented June 27, 1899.
S. GITHENS.
DEVICE FOR USE IN POULTRY CULTURE.
(Application filed Apr. 22, 1899.)
(No Model.)

Witnesses
L. C. Hills.
A. L. Hough

Inventor
Samuel Githens,
By Franklin H. Hough
Attorney

UNITED STATES PATENT OFFICE.

SAMUEL GITHENS, OF RANDALL, KANSAS.

DEVICE FOR USE IN POULTRY CULTURE.

SPECIFICATION forming part of Letters Patent No. 627,918, dated June 27, 1899.

Application filed April 22, 1899. Serial No. 714,077. (No model.)

*To all whom it may concern:*

Be it known that I, SAMUEL GITHENS, a citizen of the United States, residing at Randall, in the county of Jewell and State of Kansas, have invented certain new and useful Improvements in Devices for Use in Poultry Culture; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in incubators or devices for use in poultry culture, and especially to a series of compartments having at the four meeting corners of the compartments a common watering-receptacle, whereby hens which may be setting in the various compartments may drink from the receptacle and not be allowed to pass from one compartment to another.

The invention relates, further, to a device of this character in which are arranged a series of compartments with sufficient spaces left between one another to allow of perfect ventilation, the upper and lower walls of each compartment being formed out of wire-gauze, each compartment having a sliding nest-containing drawer, also having a gauze bottom, whereby the nest and compartments may be easily and readily cleansed.

To these ends and to such others as the invention may pertain the same consists, further, in the novel construction, combination, and adaptation of the parts, as will be hereinafter more fully described and then specifically defined in the appended claims.

My invention is clearly illustrated in the accompanying drawings, which, with the letters of reference marked thereon, form a part of this application, and in which—

Figure 1:
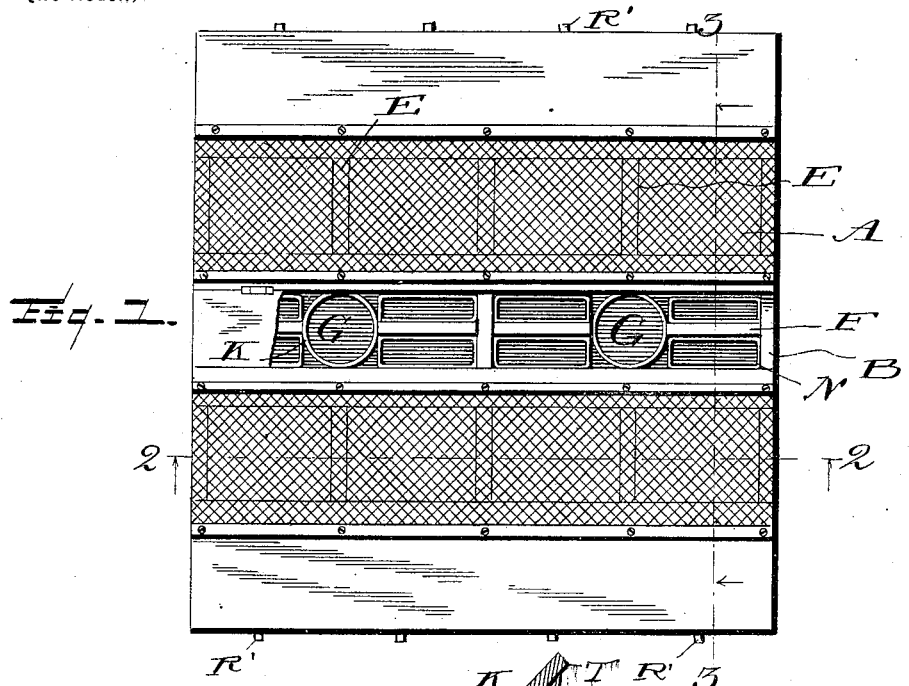
Figure 2:
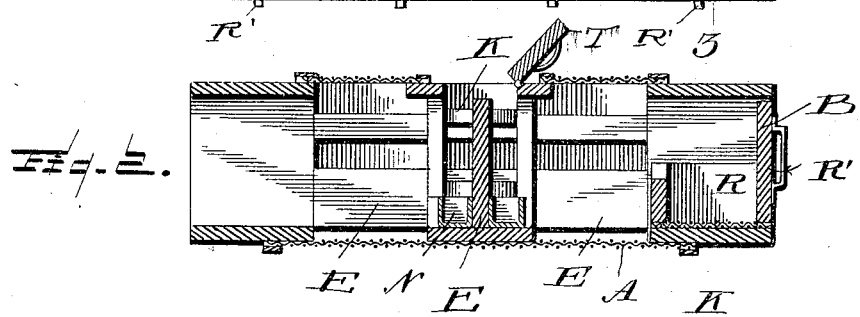
Figure 3:
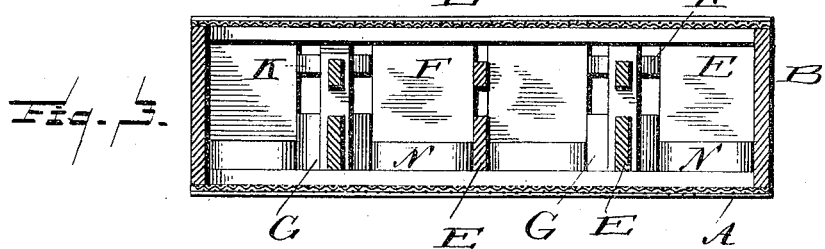
Figure 4:
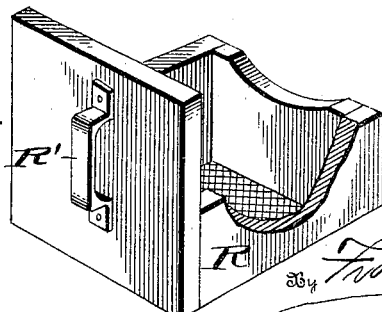

Figure 1 is a top plan view of my invention. Fig. 2 is a sectional view through a series of the compartments. Fig. 3 is a sectional view on line 3 3 of Fig. 1. Fig. 4 is an enlarged detail view of a nest-drawer.

Reference now being had to the details of the drawings by letter, A designates the wire bottom of the cage, which contains a series of compartments, more or less, as may be desired, and the outside walls B are solid and may be made of any material which may be found well adapted for the purpose. The interior of the inclosure has intersecting partitions E E, with sufficient spaces left between the partition-boards to allow for ventilation, and on the centrally-disposed board F are located the watering-receptacles G, which may be of any desired shape, but in the drawings they are shown as circular or cylindrical in shape, access being had to each receptacle from the four compartments, which have common corners. In order to allow the hen to insert its head and neck through to the watering-receptacles and at the same time prevent the hen's body from passing from one compartment to another, I provide a band K, which is connected to the adjacent ends of the walls of the compartments. The top of the device is preferably covered with wire-gauze, and an open space M is left over the watering-receptacles.

In each compartment, which is open at its outer end and containing a feeding-box N in a corner of the same, it is my purpose to place a drawer R, the outer face of which is of such a size as to entirely fill or nearly so, the entrance to the compartment and to have a handle R' whereby the drawer may be pulled out or closed, and the side walls and the inner end of the drawer are cut away, the inner wall being slightly cut down to allow the hen to easily pass into the drawer and out again, as said drawers are to be utilized as nests. The bottom of the drawers are of wire-gauze, so as to make them capable of being cleansed readily when they have become infected with lice, &c.

By making an inclosure as described having the compartments with drawer-nests it will be noted that hens may be undisturbed when setting, and should none of the compartments be used for setting hens the drawers may be removed and the fowls allowed to have access to the compartments and allowed to drink from the watering-receptacles. It is my purpose also to reverse the nest-drawers so as to allow hens to get on and off the nests when not setting, and when the drawers are thus reversed of course the hens in such compartments cannot have access to the watering vessel. It is my purpose also to provide a hinged lid T, whereby the space over the watering-receptacles may be closed, if desired.

Having thus described my invention, what I claim to be new, and desire to secure by Letters Patent, is—

1. A device for poultry culture, comprising an inclosure having a series of compartments with ventilating-spaces between the same, the adjacent corners of each set of four compartments being cut away, a watering-receptacle resting in the space formed by the cutting away of the partitions, and a band secured to the ends of the partitions a slight distance above the watering-receptacle, as set forth.

2. A device of the character described, comprising an inclosure made up of a series of compartments, each of which has a feeding-box and a drawer for nesting purposes, said drawer having a wire-gauze bottom, its inner sides being cut away, and its outer face filling the opening into the compartment, and having a handle, as shown and described.

In testimony whereof I affix my signature in presence of two witnesses.

SAMUEL GITHENS.

Witnesses:
B. H. GORDON,
JOHN COOPER.